March 31, 1970    M. V. SUSSMAN    3,503,712
APPARATUS FOR EFFECTING INTERACTIONS OF FLUIDS AT
EXTENDED SOLID SURFACES
Filed May 18, 1966    3 Sheets-Sheet 1
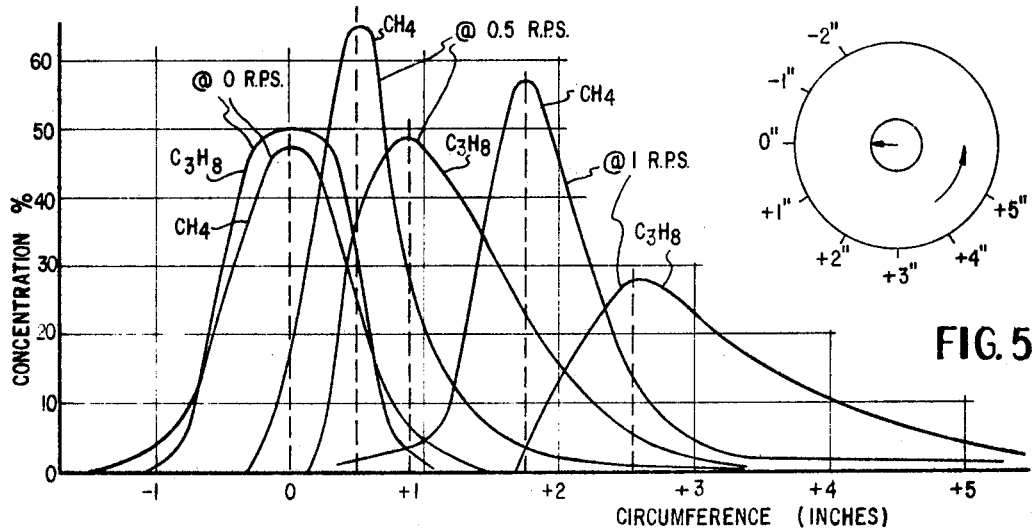
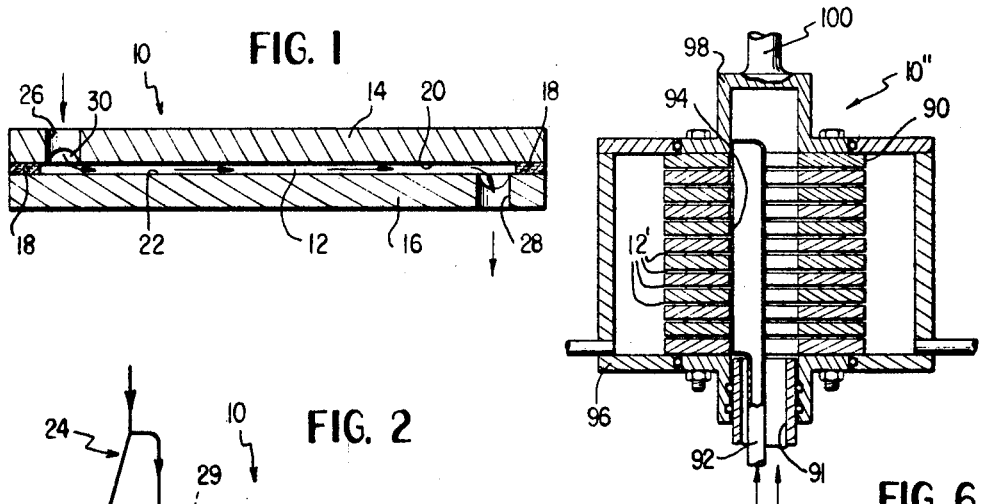
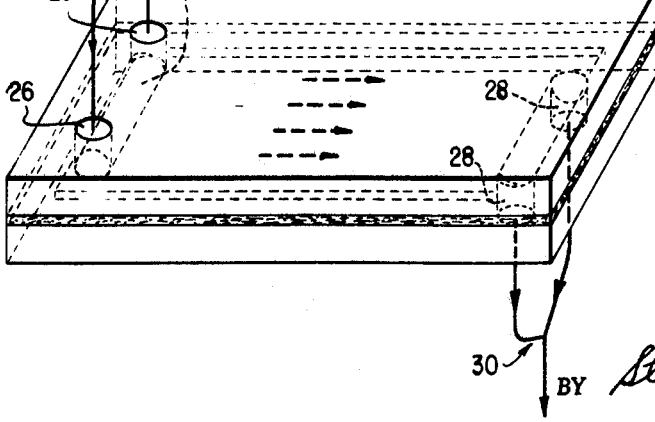
INVENTOR
MARTIN VICTOR SUSSMAN
BY Stowell & Stowell
ATTORNEYS.

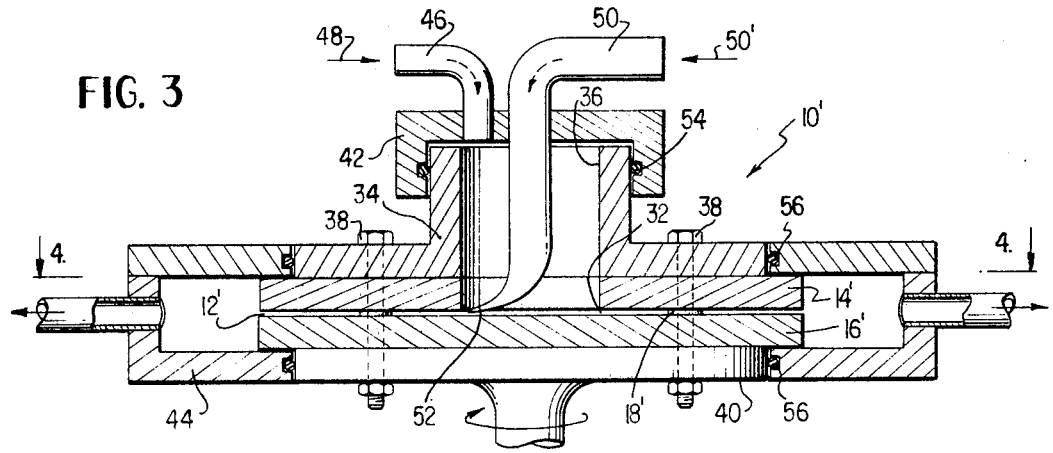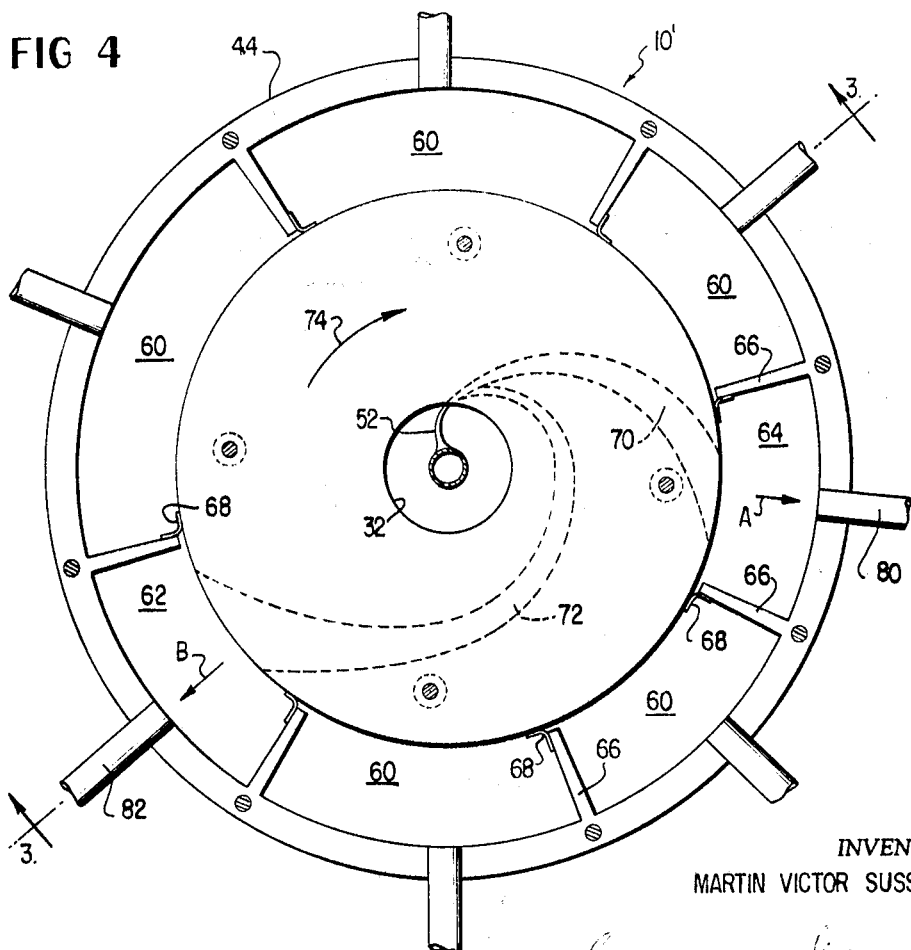

March 31, 1970    M. V. SUSSMAN    3,503,712
APPARATUS FOR EFFECTING INTERACTIONS OF FLUIDS AT
EXTENDED SOLID SURFACES
Filed May 18, 1966    3 Sheets-Sheet 3
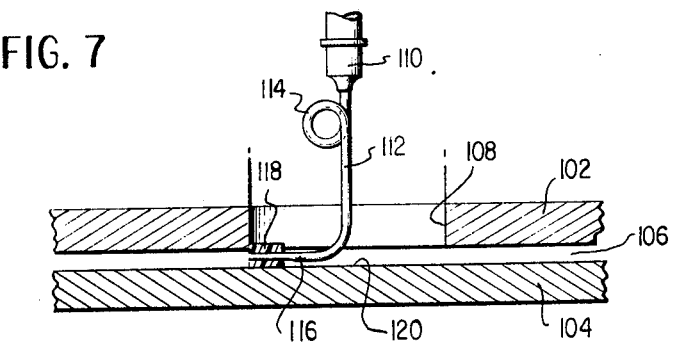
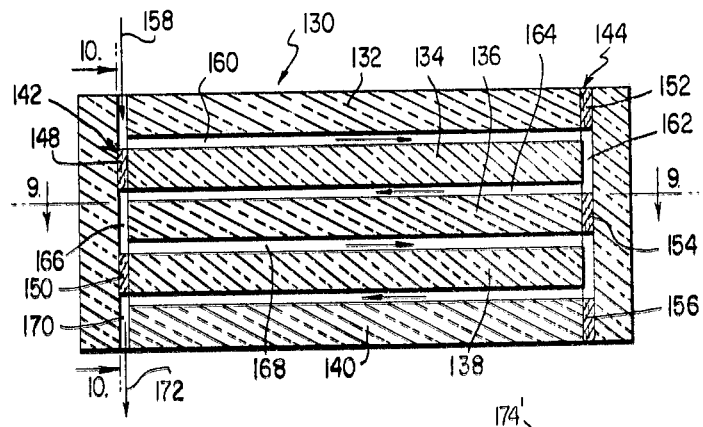
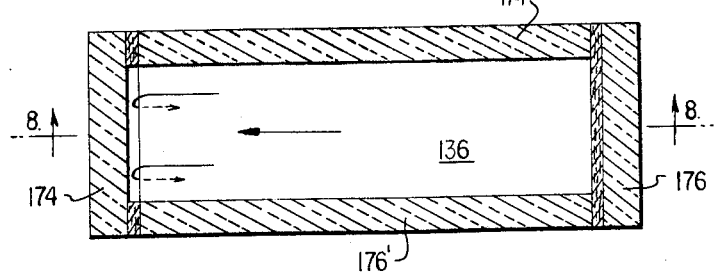
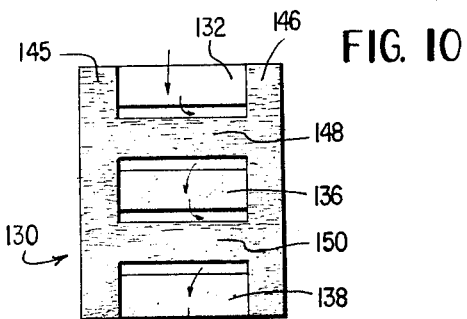
INVENTOR.
MARTIN VICTOR SUSSMAN
BY
ATTORNEYS.

United States Patent Office 3,503,712
Patented Mar. 31, 1970

3,503,712
APPARATUS FOR EFFECTING INTERACTIONS OF FLUIDS AT EXTENDED SOLID SURFACES
Martin Victor Sussman, Lexington, Mass., assignor to Research Corporation, New York, N.Y., a non-profit corporation of New York
Filed May 18, 1966, Ser. No. 551,089
Int. Cl. B01j 9/04; B01d 53/00; G01n 31/08
U.S. Cl. 23—252                     8 Claims

ABSTRACT OF THE DISCLOSURE

Chemical and physical interaction of fluids is carried out in apparatus including at least one pair of separable members mounted in fixed, spaced parallel relation to define between the opposed surfaces of the separable members a reaction channel with the opposed surfaces forming the channel spaced about .00004 to about .25 inch and having a substantially larger areal dimension. One or both of the opposed surfaces forming the channel may be coated with a solvent or chemical catalyst and fluid inlet and outlet means are provided for directing the fluid or fluids to be separated or modified through the formed channel.

---

This invention relates to apparatus for effecting interactions of fluid substances adjacent extended solid surfaces. Such interactions may be physical as in chromatography wherein a solvent substance may be carried on the solid surfaces or chemical wherein a catalytic material or a reactant may be carried on the solid surfaces or a product or reactant may be differentially adsorbed at the solid surfaces.

The apparatus of the invention will be more particularly described with reference to its use in effecting chromatographic separations.

Prior art chromatographic separators and particularly gas chromatographic separators have been developed to a considerable degree and such apparatus have substantial utility as analytical tools in both the commercial and research laboratories. Prior art gas chromatographic separators, however, suffer from substantial disadvantages. For example, prior art apparatus can handle only exceedingly small quantities of materials and generally only intermittently or discontinuously.

The conventional chromatographic device consists essentially of a small diameter tube, usually of about ¼″ internal diameter, packed with a particulate inert solid which has been coated with a thin layer of nonvolatile material, which can act as a solvent for the components of the mixture to be analyzed. To operate the conventional chromatographic device a very small amount of the mixture to be analyzed in placed in the top of the packed tube called a "chromatographic column" and a stream of inert gas, usually helium, hydrogen or nitrogen is then passed through the column. The inert "carrier" gas tends to sweep the mixture down through the column and separation of the mixture components occurs as the mixture is swept through the column by the inert gas becase of different affinities of each mixture component for the nonvolatile solvent phase.

The retardation or retention time of a mixture component in such a column will vary directly with the component's affinity for the solvent phase. Thus a component that has only a small affinity for the solvent phase will be swept through the column more rapidly than a component which has considerable affinity for the solvent phase. By placing suitable detecting devices at the exit of the column, the quantity and even the identity of the various components can be determined as they are eluted from the column exit.

Difficult separations require very long columns, with an accompanying increase in the time necessary to perform an analysis. A more serious shortcoming in some applications is the fact that prior art devices are basically analytical instruments and are not particularly suited for the preparation of substantial quantities of pure samples of material because they can handle only minute quantities of mixtures and handle these only on an intermittent basis. The preparation of significant amounts of pure mixture components with conventional chromatographic devices requires that the usual analytical procedure be repeated thousands of times with provision made to collect a tiny amount of desired component each time it is swept out of the column exit.

The present invention overcomes the shortcomings of the prior art chromatographic separators and provides a device having substantial utility in both the commercial and research laboratory.

An objective of this invention is to permit separation of mixtures on a continuous or intermittent basis and with greater resolution than has heretofore been possible.

Another objective of this invention is to accomplish the separation very rapidly with separation times in the order of less than one second, and in a very compact space.

A further objective of this invention is to provide a device which has high separation capacity and that can handle large quantities of materials.

Still another objective of this invention is to provide a device which can be used both for the analysis of complex mixtures as well as the preparation of pure chemicals from complex mixtures of these chemicals.

Another objective of the invention herein described is to provide a device which allows the continuous and simultaneous separation and collection of a multiplicity of components of a fluid mixture.

A further object of the invention is to provide apparatus for carrying out chemical reactions wherein at least one reactant is a fluid substance.

These and other objects and advantages are provided by apparatus comprising a plurality of planar extended surface members, means maintaining said members in generally parallel spaced relation to define at least one channel having an intersurface dimension small in relation to the areal dimensions of the extended surface members, means providing a fluid inlet into said channel and means providing an outlet from said channel remote from said inlet. In general, good chromatographic separations can be obtained with spacings between the extended surface members in the order of from about .01 inch to less than about .00004 inch, while rough separations or substantial enrichment can be obtained with spacings in the order of from about .25 inch to .01 inch. Spacings of the same order of magnitude are suitable for carrying out chemical reactions.

The invention will be particularly described in reference to the accompanying drawings wherein:

FIGURE 1 is a vertical sectional view through one form of the apparatus of the invention;

FIGURE 2 is a diagrammatic perspective view of the apparatus illustrated in FIGURE 1;

FIGURE 3 is a sectional view on line 3—3 of FIGURE 4 illustrating an improved continuous rotating flat plate chromatographic separator constructed in accordance with the teachings of the present invention;

FIGURE 4 is a section substantially on line 4—4 of FIGURE 3;

FIGURE 5 is a chart based on the operation of the apparatus illustrated in FIGURES 3 and 4 operating at 0, 0.5 and 1 revolution per second during the separation of a two component mixture employing as the absorbent a silicone grease;

FIGURE 6 is a vertical sectional view of a modified form of the apparatus of the invention showing a plurality of separator cells interconnected for parallel operation;

FIGURE 7 is a fragmentary partial sectional view of a modified form of feed tube for apparatus such as illustrated in FIGURES 3 and 4;

FIGURE 8 is a sectional view through a series flow flat plate array separator constructed in accordance with the principles of the invention;

FIGURE 9 is a section on line 9—9 of FIGURE 8;

FIGURE 10 is a section on line 10—10 of FIGURE 8; and

FIGURE 11 is a diagrammatic representation of the use of the apparatus of the present invention for transmission and decoding of information.

In general the resolving power of a gas chromatographic column is inversely related to a quantity called the "HETP" (height equivalent to a theoretical plate). The smaller the HETP the greater the separation that can be accomplished in a given length of column. Thus the resolving power of a capillary chromatographic column is very great and theoretical and experimental analysis have shown that the HETP of such a column is of the same order to magnitude as the diameter of the capillary. Capillary columns having an internal diameter of .0015 inch have been constructed and demonstrated to have HETP's of as low as about .004 inch.

Although these columns have very great resolving power per foot of length, they suffer from the serious disadvantage of being able to handle only microquantities of sample. They are also very difficult to construct because of the problems inherent in producing a uniform coating of solvent phase on the inside of a very small bore capillary.

The chromatographic separation device of this invention has the exceedingly small HETP of the capillary chromatographic column, but overcomes the difficulties of uniform solvent phase preparation and small capacity inherent in the capillary column. More importantly, the device of this invention can be used to obtain continuous chromatographic separation.

Referring to the drawings and in particular FIGURES 1 and 2, 10 generally indicates an improved separator which consists of a novel chromatographic separation channel 12 which is formed by opposing pairs of flat plates 14 and 16, held apart by suitable gaskets and/or spacers 18. The spacing gaskets 18 used are of a very uniform and controlled thickness and may be of composition, plastic or metal foil. The thickness of the spacing gaskets determines the depth of the gas flow channel and hence the resolving power or HETP of the chromatographic separation device 10. The depth of the gas flow channel and hence the gasket thickness employed is usually between 1 micron and .10 inch. The facing surfaces 20 and 22 of the flat plates 14 and 16 which form the lateral walls of the chromatographic channel 12 are coated with a solvent phase that is suitable for the mixture to be separated. The flat plate-spacer assembly is held together by suitable clamping devices which hold the plates and the spacing gaskets in a fixed and rigid relationship.

In view of the fact that the chromatographic channel 12 can be disassembled and opened, it is possible to carefully control the composition, nature, thickness, and distribution of the solvent phase in a manner which cannot be achieved in a conventional chromatographic column whether it be of the packed or capillary variety. The accessibility to the interior of the chromatographic channel 12 is an important feature of this invention and permits one to deposit different solvents on each of the opposing plates forming the chromatgraphic channel. If needed, one or more solvents can be put down in controlled and reproducible patterns, mixtures of solvents may be used, and it is possible to use parallel swaths of solvents and the thickness of the solvent layer can be controlled, if desired. In addition, should the flat plate chromatographic channel become exhausted or plugged, it can be opened, cleaned and renewed in a highly expedient fashion.

As shown in FIGURES 1 and 2, means 24 are provided for conducting carrier gas and vapor mixtures to the dual inlet ports 26 and means 30 are provided for removing component gases from the exit ports 28. It will be noted that the dual inlet gas ports 26 are connected by a channel 29 which runs in the lateral direction to assist in producing a uniform flow of gas as indicated by the directional arrows between the faces 20 and 22 of the pair of plates 14 and 16.

Of great importance is the fact that the channel 12 has a very wide lateral dimension and has a vastly greater capacity than a single capillary column, although its HETP is as low or lower than that of a single capillary column. The capacity can be increased even further by forming a pile of chromatographic plates, by simply stacking more than two plates, one above the other, with spaces between each plate and with solvent phases deposited on each plate surface as to be more fully described hereinafter.

The spacing gaskets 18 thickness may range from less than about .00004 inch to about 0.250 inch. A preferred thickness is between about .001 inch and about .050 inch. The lateral width of the gas passageway will generally be greater than the depth of the passageway and preferably will be more than 100 times the thickness of the spacing gaskets 18. The gas passageway or channel 12 is bounded by the coated surfaces of the flat plates 14–16 and the spacing gaskets, and the flow passageway must have a uniformly deep cross section so that the lateral gas velocity profiles are reasonably flat. To ensure a constant cross-sectional channel depth the plate surfaces 20 and 22 forming the channel walls are ground very flat. The plates may be made of any suitable dimensionally stable material and a preferred material for plate construction is ground and polished glass which can be obtained in flatness of fractions of a wavelength of light at reasonable cost.

The surface of each of the plates facing on the gas passageway 12 is coated with a layer of suitable solvent material or materials. The nature of the solvent varies with the mixture to be analyzed; however, a typical solvent is a thin layer of dioctyl phthalate, which has been deposited on the plates from a dilute solution of 5% dioctyl phthalate in benzene. Each unassembled plate is covered with the 5% solution and the benzene allowed to evaporate, leaving behind a thin coating of the desired nonvolatile solvent phase. The phthalate phase is suitable for separation of a great variety of organic chemical vapors from mixtures of these vapors. For example, mixtures of aromatic and substituted aromatic compounds, paraffinic compounds, olefinic compounds, chlorinated hydrocarbons and similar materials can be separated into their individual components.

An example of the operation of flat plate chromatograph follows:

A chromatographic plate assembly is made up as shown in FIGURES 1 and 2. The plates consist of two rectangular glass flats which are 10 inches long, 4 inches wide and ½ inch thick. The plates have been polished to a flatness of within ½ wave length of blue light. The facing surfaces 20 and 22 of the plates are coated with a dioctyl phthalate solvent phase in a manner such as previously described and a rectangular gasket 18 is placed between the plates to form a gas passageway 12. The gasket thickness is .002 inch. Suitable clamps not shown are then placed on the assembly to hold the components in a fixed and rigid position, and means 24 are provided for conducting carrier gas and vapor mixtures to the dual inlet ports 26 and means 30 are provided for removing effluent gases from the exit ports 28. The conduit means 30 leading from the dual outlet ports 28 lead to a suitable detector. The detector can be any of a number of commercially available devices that have been developed for gas chromatography effluent detection. A flame ionization gauge is particularly suited for this application because of its rapid response characteristics.

In typical operation, the plate assembly, connecting conduits and clamping means are enclosed in a constant temperature air bath. A bath temperature of about 120° C. may be used to separate mixtures of benzene and toluene. A stream of helium is fed to the inlet ports 26 at a rate of 1 ml. per minute. One-tenth (1/10) ml. of a mixture of benzene and toluene is then injected into the helium stream with means being provided to vaporize the mixture immediately upon its entry into the stream. Such means are standard in conventional gas chromatographic equipment. Within a few seconds after the injection the recording device associated with the effluent detector records its first peak. This is the air peak produced by the small amount of air which is always introduced during the injection of the sample. Shortly thereafter the recorder registers a peak for benzene and thereafter it registers a peak for toluene. The areas of the peaks are proportional to the volumes of benzene and toluene introduced into the carrier gas stream.

Referring to FIGURES 3 and 4, there is illustrated the use of flat plate chromatographic channels for continuous separation and preparative procedures. The device 10' shown in FIGURES 3 and 4 consists of a circular chromatographic plate assembly comprised of an upper plate 14' containing a feed orifice 32 and a lower plate 16' which together define the chromatographic channel 12' whose thickness is determined by spacing gaskets 18'. The plates are surmounted by an inlet flange 34 having an axial channel 36 which serves as an access for carrier gas and mixture vapors to the chromatographic channel 12'. This entire assembly is then fastened by means of bolts 38, which pass through the spacing gaskets 18', to the rotating turntable 40. A stationary feed bonnet 42 and a stationary collection ring 44 complete the essential elements of the continuous chromatography device 10'. The feed bonnet 42 contains a carrier gas supply conduit 46 and the flow of carrier gas is indicated by arrows 48. The bonnet also contains a rigidly fastened vapor mixture feed conduit 50 which passes through the stationary feed bonnet 42 through the feed flange orifice 36 and delivers vapor mixture through its capillary tip 52 to the inner periphery of the annular chromatographic gas flow channel 12' formed by the opposed surfaces of the circular plates 14' and 16'. The facing surfaces of plates 14' and 16' are coated with a thin layer of a suitable nonvolatile solvent material as described previously. A sealing ring or packing material 54 placed between rotating inlet flange 34 and stationary feed bonnet 42, serves to prevent the escape of the gases between the fixed bonnet and the rotating flange. Similar seals 56 are placed between the stationary collecting ring 44 and the rotating plate assembly. The stationary collecting ring is divided into a series of collecting chambers 60, 62, 64 (FIGURE 4) separated by partition means 66 whose tips 68 form flexible seals against the external periphery of the circular chromatographic plates 14' and 16'.

In FIGURE 4, the continuous chromatograph is shown separating a mixture of two components. Under the operating conditions depicted, one component describes a path indicated by spiral swath 70 whereas the other follows a path through the chromatographic gas channel indicated by spiral swath 72. The rotating assembly is turning at a speed of 0.25 revolution per second in the direction indicated by arrow 74. The binary mixture of vapors enters the system through vapor feed conduit 50 via the path indicated by the arrow 50' and is discharged through capillary tip 52 at the inlet annulus 32. The feed mixture contains vapors which are designated as (A) following swath 70 and (B) following spiral swath 72. The opposing faces of plates 14' and 16' are coated with a suitable solvent phase to separate these two components. The internal diameter in orifice 32 is, typically, two inches. The external diameter of the plates is 22 inches. Under the temperature and solvent phase conditions that exist, component (A) has a retention time of 1 second in the chromatographic channel 12'. Component (B) has a retention time of 2.5 seconds in the channel. Carrier gas is admitted to the conduit 46 prior to beginning the admission of the vapor mixture. With the carrier gas flow established, vapor mixture is allowed to flow continuously into conduit 50 and is discharged through capillary tip 52 into the chromatographic channel 12'. With the chromatographic channel assembly turning in direction 74 at .25 revolution per second, component (A) is discharged into collection ring segment 64 and leaves via the exit port 80 serving that compartment, to a suitable collection container. Simultaneously, component (B), having a retention time of 2.5 seconds, leaves in collection sector 62 and is removed via the tap 82, serving that sector.

Another example of operation of the device illustrated in FIGURES 3 and 4 is diagrammatically depicted in FIGURE 5 wherein the rate of rotation of the channel of the circular chromatographic device is 0, 0.5 and 1 r.p.s. as indicated on the chart. In the depicted separation the sample was composed of 50% $CH_4$ and 50% $C_3H_8$ and the sample was fed to the separator at the rate of .5 cc. per second and the carrier gas was set at the rate of 2.5 cc. per second to provide a carrier to mixture ratio of 5. Component separation improves as channel rotation speed is increased.

In FIGURE 6 of the drawings a further form of apparatus constructed in accordance with the present invention, is illustrated and generally designated 10". The apparatus 10" is similar to that illustrated in FIGURES 3 and 4 except that separation takes place in a plurality of superimposed channels 12" maintained between annular plates generally designated 90 all but the first and last of which have both surfaces ground to a very flat configuration and each of the surfaces is separated from the opposed surface of the next in a series of the plates 90 by suitable gasket means of the type illustrated in FIGURES 3 and 4.

In FIGURE 6 the carrier gas is introduced via inlet means 91, and the mixture to be separated is introduced via inlet means 92 which leads to an elongated capillary outlet means 94. The separated samples are collected in sample collecting ring means 96 which is stationary with respect to the rotating plates and rotating hub means 98 driven by shaft 100 coupled to a suitable and preferably variable speed control means. Operation of the device illustrated in FIGURE 6 is fully equivalent to the operation described with reference to the form of the invention illustrated in FIGURES 3 and 4 of the drawings.

In FIGURE 7 a modified form of gas inlet feed tube is illustrated for use in conjunction with a rotating plate type separator such as illustrated in FIGURES 3 and 4. In FIGURE 7 upper and lower plates 102 and 104 are spaced by suitable gasket means not shown to provide an annular separation channel 106. An opening 108 in the upper plate 102 provides a zone for the introduction of for example the carrier gas into the channel 106. The sample gas is directed through conduit 110 to a tube 112 provided with a, for example, single turn coil 114 to provide a degree of flexibility in the outlet end 116 of the discharge tube. The end of feed tube is provided with a plastic tip 118 which makes sliding contact with the upper surface 120 of the lower plate 104 and the peripheral surface of opening 108.

The single turn coil 114 insures a firm sliding contact between the lower surface of the plastic tip 118 and the upper surface of the lower plate 104 and thus aids in the introduction of the analysis mixture directly into the channel 106.

Referring particularly to FIGURES 8, 9 and 10, there is shown a modification of the form of the invention illustrated in FIGURES 1 and 2 including a multiple flat plate assembly 130 which may advantageously be used to extend the effective area of and particularly the length of the flat plate chromatographic channel 12 illustrated in FIGURES 1 and 2. Such an assembly has the advantage of using both faces of optically flat plates to form the active surfaces of the chromatographic device. Employing both surfaces of the ground plates presents a substantial saving as it is the common practice in preparing optical flats to grind both surfaces parallel and flat.

In FIGURES 8, 9 and 10 the assembly 130 includes plates 132, 134, 136, 138, and 140 which are maintained in spaced parallel relationship by a pair of end gasket means 142 and 144. In FIGURE 10 gasket 142 is illustrated and includes vertical webs 145 and 146 and pair of transverse webs 148 and 150. The other gasket 144 also includes the pair of vertical webs and three transverse webs designated 152, 154 and 156. It will be noted that transverse webs 148 and 150 are in staggered relationship to transverse gasket webs 152, 154 and 156 so that a fluid entering, as illustrated by directional arrow 158, flows through channel 160, about end 162 of plate 134, through channel 164, about end 166 of plate 136, then through channel 168, etc., to exit adjacent edge 170 as illustrated by directional arrow 172. The assembly is held in the illustrated position by two pairs of flat plates generally designated 174 and 176, 174' and 176' and suitable clamp means not illustrated in the drawings.

The devices constructed in accordance with the teachings of the present invention are not limited to, for example, methods of obtaining pure chemicals from mixtures as the speed and accuracy of separations carried out by apparatus such as illustrated in FIGURES 3 and 4 of the present invention lend themselves to other uses. For example, in FIGURE 11 there is diagrammatically illustrated the continuous chromatographic system of the present invention being used as an information transmission and decoding device generally designated 180. The member designated 182 diagrammatically represents apparatus such as shown at 10' in FIGURES 3 and 4, having output stations A, B, C, D and E corresponding, for example, to output stations such as 80 and 82 of the FIGURES 3 and 4. Information indicated by reference characters 184, 186 and 188 is transmitted to the input conduit as a fluid composition which varies with time. The fluid contains, as illustrated in FIGURE 11, components A, B, C, D and E plus an inert carrier component. These components A, B, C, D and E are chosen such that they will be separated or "read out" at, for example, positions A, B, C, D and E positioned about the periphery of the apparatus 182. Information is sent through the mixture feed tube as a time varying composition. While five components have been shown in the input signal stream, the number of channels in the input signal stream depends on the number of components that can be separated at one time with each component carrying information which is coded as a composition of that component.

The apparatus of the invention also provides a novel continuous chemical reactor for carrying out difficult chemical reaction processes, particularly processes where the progress of the chemical transformation or reaction when carried out in a conventional reactor is limited, stopped, or retarded by the product formed by the reaction, or by the deactivation of catalysts that promote the reaction, or by further reaction of the product with reactants to form undesirable secondary products.

In chemical reaction processes the extent of conversion of chemical reactant into chemical product is frequently limited by what are known as equilibrium phenomena. As the concentration of product builds up in the reaction vessel, the extent of conversion of reactant to product slows down and ultimately ceases. Another effect that limits the completeness of a chemical conversion occurs in chemical reaction processes which involve heterogeneous catalysis, that is the reaction of vapors or liquids on the surface of a solid. In such heterogeneously catalyzed processes the product formed by the surface reaction may cling to the surface so tenaciously that the surface loses all or part of its catalytic activity and its ability to promote further reaction. A further limitation on chemical reaction completeness occurs when the product can combine with reactants to form undesirable secondary products.

As a general exampule, consider a monomolecular reaction where reactant A produces product B. If the equilibrium constant for this reaction is low, very little B will be produced in a reactor filled with A. (The equilibrium constant is the ratio of the concentration of B to the concentration of A at the condition where no further reaction occurs.) If, however, B can be removed from the presence of A, then more of A will be formed and if means can be found to remove B entirely, then all of A will be converted into B.

A somewhat similar situation exists if chemical reactants A and B, which for the purpose of this example can be considered to be vapors of gases, react in the presence of a solid catalyst to form chemical product C. If product C coats the surface or is strongly adsorbed on the surface of the catalyst, then the reaction will proceed only until sufficient C has been formed to cover the entire catalyst surface. At this point the reaction will stop. If the reaction is to continue, then fresh surface must be presented to the reactants A and B.

Alternatively, reactants R and S may combine to form desired product P. However, P reacts readily with any unreacted S it may contact to form an undesired byproduct Q.

Such limitations on chemical conversion can be overcome by carrying out the reaction in a continuous channel reactor in such a way that reactants are separated or swept away from products immediately after they are formed. For example, in the reaction wherein A and B go to form C on the surface of a catalyst, the channel is prepared with a surface coating of catalyst on the facing plate surfaces, or with porous catalyst of a suitable type held between the plates. Component A is introduced into the channel, for example, through inlet 50 of FIG. 3 and component B is supplied to the channel bonnet through conduit 46 in place of the carrier gas. The channel is rotated at a rate dependent upon the reaction rate and the flow rates of the reactants, such that component A is completely reacted before it reaches the external periphery of the rotating channel catalytic reactor. As product C is formed, reactant A is swept away from the C contaminated region on to fresh catalyst surface by the sweeping action of reactant B, which now acts as the carrier gas. Product C is slowly washed off the catalyst surface by the continuing flow of carrier B, and exits mixed with B over a relatively wide angle of discharge.

As an example of channel reactor operation in the apparatus of FIG. 3 reactor, two mols of acetone are reacted in the presence of an organic base, triethylamine, to form diacetone alcohol. The channel surfaces are acid etched to increase their surface areas and are then washed and dried. After drying the plates are assembled with the prepared surfaces facing each other and separated by .005 inch.

The plates are rotated at a speed of one revolution per second. Acetone liquid at room temperature is introduced through conduit 46 at a rate of one cubic centimeter per second through the reactor inlet periphery and allowed to flow radially outward through the channel in all directions.

Triethylamine is introduced at a rate of 0.1 cubic centimeter per second through a conduit 52. The diacetone alcohol is formed where the base and acetone contact each other. This product has less affinity for the glass surface than does the triethylamine, and it is swept from the presence of the base by the flow of acetone. The diacetone alcohol product is collected as a mixture with carrier reactant acetone over an angle that extends from 30–120 degrees beyond the point of base feed. At an angle of 120 to 160 degrees beyond the point of base feed introduction triethylamine and carrier component acetone is collected. The conventional equilibrium conversion for the reaction of acetone to form diacetone alcohol in the presence of a homogenous base catalyst is less than 1%. For the system here described, the acetone is completely converted by separating unreacted acetone from the base and recirculating this acetone through the continuous reactor.

From the foregoing description, considered in view of the various forms of the invention illustrated in the drawings, it will be seen the present invention fully accomplishes all of the objects and advantages hereinbefore set forth. It will also be apparent to those skilled in the art that various modifications may be made in the form of the structures and their use without departing from the scope of the present invention.

While stationary and rotating devices have been specifically illustrated, the principles of the invention may be equally well applied to apparatus wherein the flat plate channel forming elements are reciprocated relative to either stationary or relatively reciprocally mounted input and output channel elements.

I claim:
1. Apparatus for effecting physical and chemical interaction of fluid substances adjacent extended solid surfaces comprising a plurality of separable planar extended surface members, means maintaining said separable members in generally parallel spaced relation to define at least one channel having an intersurface dimension from about .00004 to about .25 inch and a width in the order of at least 100 times the intersurface dimension of the extended surface members, means providing a fluid inlet into said channel, means providing an outlet from said channel remote from said inlet and at least one of said channel forming surfaces having a coating applied thereto which is interactive with the fluid introduced into said inlet channel.

2. Apparatus as defined in claim 1 wherein the extended surface members are mounted for movement relative to the inlet and outlet means.

3. Apparatus as defined in claim 1 wherein the extended surface members define a plurality of substantially parallel channels.

4. Apparatus as defined in claim 3 wherein the inlet and outlet means are arranged to provide serial flow through the channels.

5. Apparatus as defined in claim 3 wherein the inlet and outlet means are arranged to provide parallel flow through the channels.

6. Apparatus as defined in claim 1 wherein the extended surface members are mounted for rotation relative to the inlet and outlet means.

7. Apparatus as defined in claim 6 wherein the inlet means is adjacent the axis of rotation of the extended surface members and the outlet means is adjacent to periphery of said members.

8. Apparatus for effecting physical and chemical interaction of fluid substances adjacent extended solid surfaces comprising a pair of separable extended surface members, means maintaining said separable members in generally fixed parallel spaced relation to define a channel having an intersurface dimension of from about .00004 to about .25 inch and a width in the order of at least 100 times the intersurface dimension of the extended surface members, means providing a fluid inlet into said channel, means providing an outlet from said channel remote from said inlet and at least one of said channel forming surfaces having a coating applied thereto which is interactive with the fluid introduced into said inlet channel.

References Cited

UNITED STATES PATENTS

| | | |
|---|---|---|
| 3,088,271 | 5/1963 | Smith. |
| 1,285,823 | 11/1918 | Snelling _____ 23—252 X |
| 2,476,152 | 7/1949 | Levinson et al. _____ 23—252 X |
| 2,526,657 | 10/1950 | Guyer _____ 23—288.92 |
| 2,920,478 | 1/1960 | Golay _____ 73—23.1 |
| 3,078,647 | 2/1963 | Mosier _____ 55—197 |
| 3,080,307 | 3/1963 | Rinald _____ 23—252 |
| 3,113,103 | 12/1963 | Lowery. |
| 3,149,941 | 9/1964 | Barnitz et al. _____ 55—386 |
| 3,162,506 | 12/1964 | Delassus et al. _____ 23—252 X |

FOREIGN PATENTS 897,267   5/1962   Great Britain.

JOSEPH SCOVRONEK, Primary Examiner

U.S. Cl. X.R.

23—253, 254, 284, 285, 288; 55—386; 73—23.1, 61.1; 116—18; 210—198; 260—594